(12) United States Patent
Chen

(10) Patent No.: US 12,098,797 B1
(45) Date of Patent: Sep. 24, 2024

(54) POSITIONING DEVICE FOR PIPELINE DETECTION

(71) Applicant: Shenzhen Sanyi Technology Co., Ltd., Guangdong (CN)

(72) Inventor: Xiaoquan Chen, Jieyang (CN)

(*) Notice: Subject to any disclaimer, the term of this patent is extended or adjusted under 35 U.S.C. 154(b) by 0 days.

(21) Appl. No.: 18/656,416

(22) Filed: May 6, 2024

(51) Int. Cl.
F16L 55/48 (2006.01)
F16L 101/30 (2006.01)

(52) U.S. Cl.
CPC .......... *F16L 55/48* (2013.01); *F16L 2101/30* (2013.01)

(58) Field of Classification Search
CPC .............................. F16L 55/48; F16L 2101/30
See application file for complete search history.

(56) References Cited

U.S. PATENT DOCUMENTS

| | | | | |
|---|---|---|---|---|
| 5,055,793 | A * | 10/1991 | Mulcahey | G01V 3/06 324/329 |
| 6,819,109 | B2 * | 11/2004 | Sowers | G01V 3/15 D10/47 |
| 7,372,276 | B2 | 5/2008 | Mulcahey | |
| 11,428,814 | B1 | 8/2022 | Olsson et al. | |
| 11,828,856 | B1 | 11/2023 | Marvin et al. | |
| 2006/0091888 | A1 * | 5/2006 | Holman | G01V 3/15 340/551 |
| 2007/0013379 | A1 * | 1/2007 | Staples | G01V 3/15 324/326 |
| 2019/0137644 | A1 | 5/2019 | Olsson et al. | |
| 2020/0324589 | A1 * | 10/2020 | Luo | B60C 29/02 |

FOREIGN PATENT DOCUMENTS

| | | | |
|---|---|---|---|
| CN | 210401299 U | * | 4/2020 |
| CN | 215581120 U | | 1/2022 |

* cited by examiner

*Primary Examiner* — Natalie Huls

(57) ABSTRACT

The present invention discloses a positioning device for pipeline detection, which comprises: a host machine and a detection part detachably connected to the host machine, wherein an accommodating cavity is formed in the host machine, a main control board is arranged in the accommodating cavity, the host machine is provided with a first connecting member, a buckling position is formed on the first connecting member, the first connecting member is provided with an ejector pin assembly, an antenna assembly is arranged in an inner cavity of the detection part, the detection part is provided with a second connecting member, the second connecting member is provided with a clamping hook, a part of the second connecting member passes into the accommodating groove and is in buckling connection with the first connecting member, and the detection part is electrically connected to the main control board through the ejector pin assembly.

10 Claims, 3 Drawing Sheets

POSITIONING DEVICE FOR PIPELINE DETECTION

TECHNICAL FIELD

The present invention relates to the technical field of pipeline receiving devices, and in particular, to a positioning device for pipeline detection.

BACKGROUND

A pipeline plays an important role in the existing urban municipality. During a regular inspection of the pipeline, a probe is conveyed into the pipeline using a pipeline detection device for examination. With the propulsion of the cable, a position of the probe needs to be located, and the pipeline can be further conveniently maintained and overhauled by workers by knowing the direction and the path of the pipeline.

The existing positioning device for the probe adopts an integrated handheld structure, which cannot be detached and assembled. The entire device occupies a large space, and is inconvenient to transport and carry.

SUMMARY

A primary objective of the present invention is to provide a positioning device for pipeline detection, which aims to solve the problem that the existing positioning device for pipeline detection cannot be detached and occupies a large space.

To achieve the above objective, the present invention provides a positioning device for pipeline detection, which comprises a host machine and a detection part detachably connected to the host machine, wherein an accommodating cavity is formed in the host machine, a main control board is arranged in the accommodating cavity, a first connecting member is arranged at one end that is of the host machine and that is connected to the detection part, a buckling position is formed on the first connecting member, an accommodating groove is formed at one end that is of the first connecting member and that is far away from the host machine, an ejector pin assembly is arranged in the accommodating groove, an antenna assembly is arranged in an inner cavity of the detection part, the detection part is provided with a second connecting member, the second connecting member is provided with a clamping hook buckled with the buckling position, a part of the second connecting member passes into the accommodating groove and is in buckling connection with the first connecting member, and the detection part is electrically connected to the main control board through the ejector pin assembly.

Optionally, an annular groove is formed on the first connecting member, the annular groove is arranged at a front end of the accommodating groove, the second connecting member is provided with an outer ring adapted to the annular groove, and the outer ring is sleeved in the annular groove.

Optionally, the ejector pin assembly comprises an ejector pin, an anti-bending plate provided at a front end of the ejector pin, and an ejector pin ring plate, and the ejector pin is placed in the accommodating groove through a fixed plate.

Optionally, an inner ring is arranged in the accommodating groove, a first concave step is arranged on the inner ring, and the ejector pin is arranged on the first concave step through a fixed plate.

Optionally, the detection part comprises a second housing, the second housing comprises an upper housing and a lower housing, the upper housing and the lower housing form the inner cavity, and one end of the second housing is sleeved on an inner side of the outer ring.

Optionally, an EVA protective jacket is further arranged on a periphery of the antenna assembly.

Optionally, one end that is of the second housing and that is far away from the host machine is further sleeved with an anti-collision soft rubber.

Optionally, the host machine comprises a first housing, the host machine is further provided with a handheld part, and the handheld part and the first housing are integrally formed. Optionally, the handheld part is provided with an anti-slip rubber.

Optionally, the host machine is further provided with a display assembly and a key assembly, a speaker is arranged in the host machine, and the display assembly, the key assembly and the speaker are electrically connected to the main control board.

Optionally, the first connecting member is configured in a polygonal shape, and the first connecting member is nested with the host machine.

According to the present invention, the detection part is in buckling connection with the host machine, the ejector pin assembly is used for signal feedback, and the host machine and the detection part can be detached and stored when not in use, thereby reducing the occupied space and making it more convenient to carry.

BRIEF DESCRIPTION OF DRAWINGS

To more clearly illustrate the technical solutions in the embodiments of the present invention or in the prior art, the drawings required to be used in the description of the embodiments or the prior art are briefly introduced below. It is obvious that the drawings in the description below are some embodiments of the present invention, and those of ordinary skill in the art can obtain other drawings according to the structures illustrated in these drawings without creative efforts.

DESCRIPTIONS OF REFERENCE NUMERALS

Figure 1:
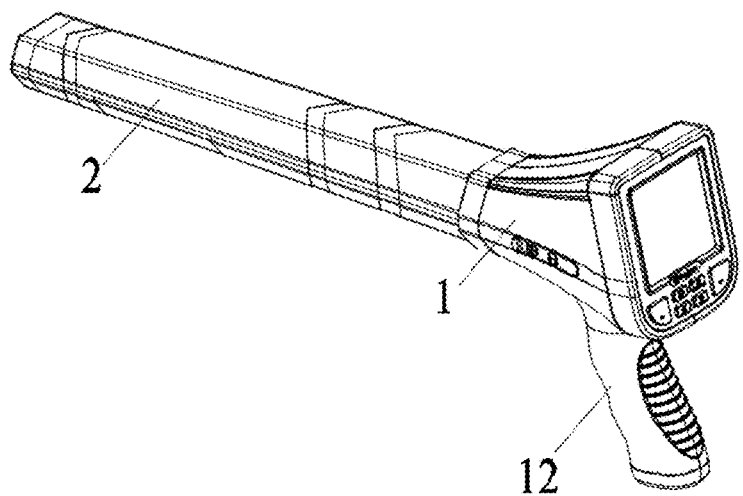
FIG. 1 is a schematic diagram of an overall structure of a positioning device for detection according to the present invention.
Figure 2:
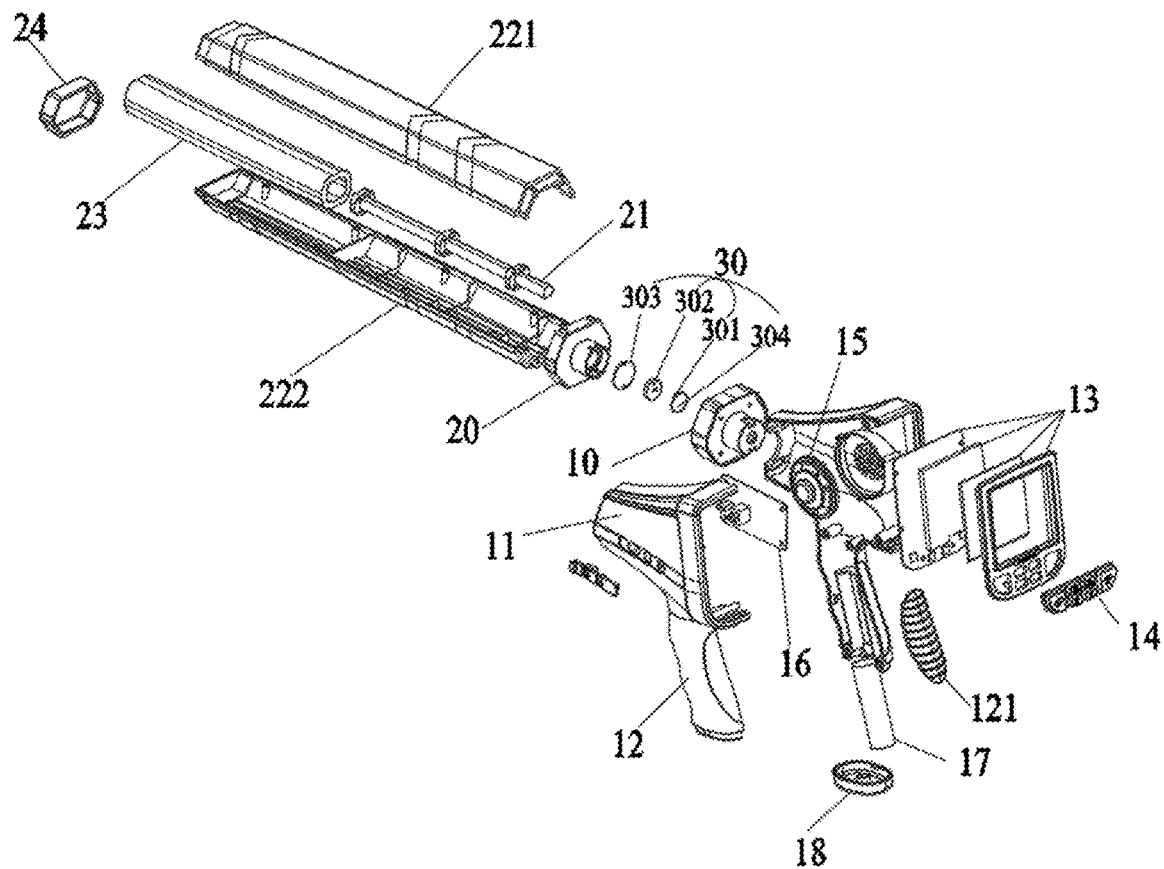
FIG. 2 is an exploded schematic diagram of a positioning device for detection according to the present invention.
Figure 3:
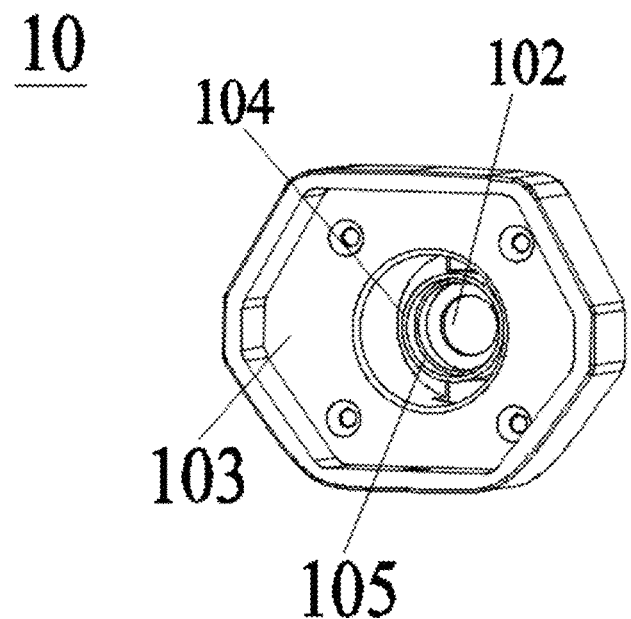
FIG. 3 is a schematic diagram of a structure of a first connecting member according to the present invention.
Figure 4:
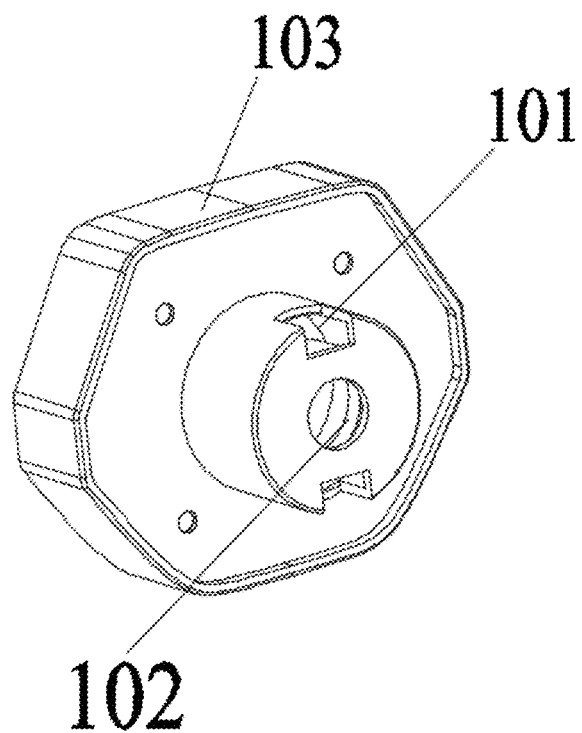
FIG. 4 is a schematic diagram of a structure of a first connecting member according to the present invention viewed from another perspective.
Figure 5:
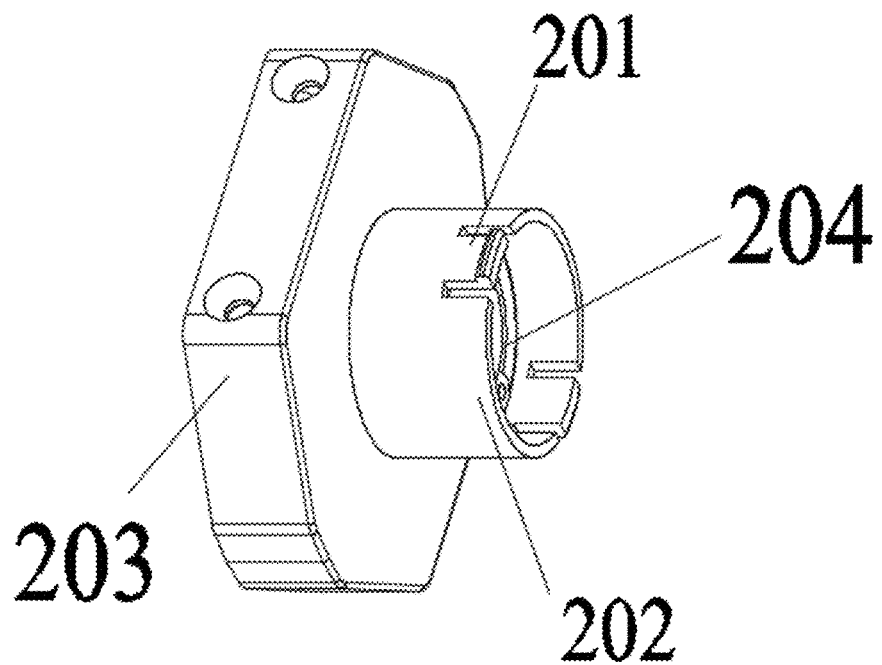
FIG. 5 is a schematic diagram of a structure of a second connecting member according to the present invention.
Figure 6:
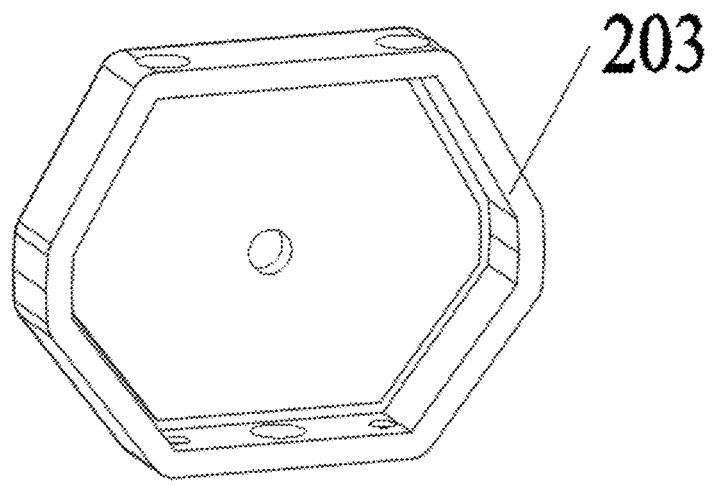
FIG. 6 is a schematic diagram of a structure of a second connecting member according to the present invention viewed from another perspective.

1: host machine; 10: first connecting member; 101: buckling position; 102: accommodating groove; 103: annular groove; 104: inner ring; 105: first concave step; 11: first housing; 12: handheld part; 121: anti-slip rubber; 13: display assembly; 14: key assembly; 15: speaker; 16: main control board; 17: battery assembly; 18: lower cover;

2: detection part; 20: second connecting member; 201: clamping hook; 202: annular structure; 203: outer ring; 204: second concave step; 21: antenna assembly; 22:

second housing; 221: upper housing; 222: lower housing; 23: EVA protective jacket; 24: anti-collision soft rubber;

30: ejector pin assembly; 301: ejector pin; 302: anti-bending plate; 303: ejector pin ring plate; and 304: fixed plate.

The realization of the objectives, the functional features, and the advantages of the present invention will be further explained in conjunction with the embodiments and with reference to the drawings.

DETAILED DESCRIPTION OF EMBODIMENTS

The following clearly and completely describes the technical solutions in the embodiments of the present invention with reference to drawings in the embodiments of the present invention. It is clear that the described embodiments are merely a part rather than all of the embodiments of the present invention. All other embodiments obtained by those of ordinary skill in the art based on embodiments of the present invention without creative efforts shall fall within the protection scope of the present invention.

It should be noted that, if directional indications (such as upper, lower, left, right, front and rear) are involved in the embodiments of the present invention, the directional indications are only used to explain the relative positional relationships, the motion situations and the like between individual components under a certain pose (as shown in the drawings), and if the certain pose is changed, the directional indications are changed accordingly.

In addition, if there are descriptions relating to "first", "second" and the like in the embodiments of the present invention, the descriptions of "first", "second" and the like are for descriptive purposes only and are not to be construed as indicating or implying relative importance thereof or implicitly indicating the quantities of the indicated technical features. Thus, a feature defined by "first" or "second" may explicitly or implicitly include at least one such feature. In addition, "and/or" appearing herein is meant to include three parallel solutions, and taking "A and/or B" as an example, it includes solution A, or solution B, or both solution A and solution B. In addition, the technical solutions among various embodiments may be combined with each other, however, this combination must be based on that it can be realized by those of ordinary skill in the art. When the combination of the technical solutions is contradictory or cannot be realized, such a combination of the technical solutions should not be considered to exist, and is not within the protection scope of the present invention.

Based on the problem that the existing positioning device for detection cannot be detached and is inconvenient to carry, the present invention provides a positioning device for pipeline detection, which comprises a host machine 1 and a detection part 2 detachably connected to the host machine 1, wherein an accommodating cavity is formed in the host machine 1, a main control board 16 is arranged in the accommodating cavity, the detection part 2 is provided with an inner cavity, an antenna assembly 21 is arranged in the inner cavity of the detection part 2, and the antenna assembly 21 is used to receive a fixed frequency signal transmitted by a transmitter in a detector. In this field, the common fixed frequency is 512 HZ, and the signal is received by the antenna assembly 21 of the positioning device and then fed back to the host machine 1, so that the positioning prompting effect is achieved.

In this embodiment, taking FIG. 1 as an example, a position of the detection part 2 is defined as a front end of the host machine 1 to describe the relative position therebetween.

According to the positioning device for detection in this embodiment, a first connecting member 10 is arranged at one end that is of the host machine 1 and that is connected to the detection part 2, a buckling position 101 is formed in the first connecting member 10, an accommodating groove 102 is formed at one end that is of the first connecting member 10 and that is far away from the host machine 1, and an ejector pin assembly 30 is arranged in the accommodating groove 102, so that the electrical connection between the antenna assembly 21 and the host machine 1 is achieved through the ejector pin assembly 30. The detection part 2 is provided with a second connecting member 20, the second connecting member 20 is provided with a clamping hook 201 buckled with the buckling position 101, and the second connecting member 20 partially passes into the accommodating groove 102 of the first connecting member 10 and is in buckling connection with the first connecting member 10, so that the detachable connection between the detection part 2 and the host machine 1 is achieved.

Through the buckle connection of the first connecting member 10 and the second connecting member 20, the detection part 2 can be detached and stored conveniently when not in use, so that the occupied space is reduced, and transportation and storage are facilitated. Meanwhile, compared with the threaded connection, the adopted buckle connection cannot be loosened in long-term use, and is favorable for ensuring the stable connection between the detection part 2 and the host machine 1.

Further, an annular groove 103 is further formed in the first connecting element 10, the annular groove 103 is arranged at one side that is of the accommodating groove 102 and that is far away from the host machine 1, the second connecting element 20 is correspondingly provided with an outer ring 203 adapted to the annular groove 103, and the outer ring 203 is sleeved on the inner side of the annular groove 103, so that the second connecting element 20 is sleeved on the first connecting element 10. The clamping hook 201 of the second connecting member 20 is arranged at one side that is of the outer ring 203 and that is close to the host machine 1, a corresponding buckling structure, as shown in the figure, may be a corresponding notch formed in the annular structure 202, when the second connecting member 20 is connected to the first connecting member 10, the annular structure 202 abuts against the inner side of the accommodating groove 102, and the clamping hook 201 is buckled with the buckling position 101. In this embodiment, two sets of the corresponding buckling connection structures are provided and symmetrically arranged to ensure stability after buckling. In other embodiments, the ring structure 202 may not be provided, and the clamping hook 201 may be directly provided to buckle with the buckling position 101.

The annular groove 103 is formed in a front end of the accommodating groove 102, and the second connecting member 20 is sleeved on an inner side of the first connecting member 10, so that the second connecting member 20 is tightly connected to the first connecting member 10, and the detection part 2 and the host machine 1 are stably mounted.

In the present invention, the ejector pin assembly 30 comprises an ejector pin 301, an anti-bending plate 302 provided at a front end of the ejector pin 301, and an ejector pin ring plate 303, and the ejector pin 301 is placed in the accommodating groove 102 through a fixed plate 304.

Specifically, the anti-bending plate 302 is correspondingly provided with a through hole for the ejector pin 301 to pass through, the ejector pin 301 is sleeved on the anti-bending plate 302 and a head part of the ejector pin 301 passes through, and the anti-bending plate 302 is preferably made of a material with a certain buffering capacity, which can play a buffering role when the detection part 2 is combined with the host machine 1 to reduce damage to the ejector pin assembly 30. The ejector pin ring plate 303 is arranged at one end that is of the ejector pin 301 and that is close to the detection part 2, the ejector pin ring plate 303 is made of a conductive material, and the sheet-like ejector pin ring plate 303 is used to further reduce the buffering of the ejector pin 301. The inner side of the annular structure 202 is provided with a second concave step 204, the ejector pin ring plate 303 is arranged on the second concave step 204, the accommodating groove 102 is provided with an inner ring 104, the inner ring 104 is provided with a first concave step 105, and the ejector pin 301 is arranged on the first concave step 105 of the inner ring 104 through a fixed plate 304. A gap for the clamping hook 201 to pass through is provided between the inner ring 104 and a groove wall of the accommodating groove 102, and a gap for buffering the ejector pin ring plate 303 when a top part of the inner ring 104 is buckled with the front end of the second concave step 204 is reserved.

In this embodiment, the ejector pin assembly 30 can be buffered and protected by the ejector pin ring plate 303 and the anti-bending plate 302 during the buckling, so that the connection damage to the host machine 1 and the detection part 2 is reduced, and the service life of the device is prolonged.

Specifically, the host machine 1 in this embodiment comprises a first housing 11, and the first housing 11 is formed by splicing two half housings. The first connecting member 10 may be configured in a polygonal shape to facilitate engaging with the second connecting member 20 and locking with the host machine 1. The first connecting member 10 is arranged at one side that is of the host machine 1 and that is close to the detection part 2, is nested with the host machine 1 and is locked by screws. The host machine 1 is further provided with a handheld part 12, the first housing 11 and the handheld part 12 are integrally formed, the host machine 1 is shaped like a "7", and the handheld part 12 is arranged to facilitate handheld use of the positioning device. The main control board 16 is arranged in a cavity above the handheld part 12, the cavity corresponding to the handheld part 12 can be used to place a battery assembly 17, the battery assembly 17 is electrically connected to the main control board 16, a lower cover 18 buckled with the first housing 11 is arranged below the battery assembly 17, and the cavity corresponding to the handheld part 12 is used to place the battery assembly 17, so that the entire device can be kept compact and simple. To facilitate the holding by the user, a surface of the handheld part 12 may be provided with an anti-slip rubber 121.

The host machine 1 is further provided with a display assembly 13 and a key assembly 14, the display assembly 13 and the key assembly 14 are electrically connected to the main control board 16, the display assembly 13 comprises a display screen, and the display screen is preferably inclined and arranged in parallel with a handle to facilitate observation by the user when holding the display screen. The key assembly 14 is used to adjust the intensity of the receiving frequency and control the brightness of the display assembly 13. The host machine 1 is further provided with a speaker 15, which emits a sound prompt for positioning when the antenna assembly 21 detects a corresponding signal.

Further, in this embodiment, the detection part 2 comprises a second housing 22, the second housing 22 comprises an upper housing 221 and a lower housing 222, the upper housing 221 and the lower housing 222 form the inner cavity, one end of the second housing 22 is sleeved on an inner side of the outer ring 203, and the second housing 22 and the second connecting member 20 can be locked by screws. The antenna assembly 21 is arranged in the inner cavity, and an EVA protective jacket 23 is further arranged on a periphery of the antenna assembly 21 for protecting the antenna assembly 21. As described above, the antenna assembly 21 is used to detect the 512 HZ frequency emitted by the transmitter. The principle and structure of the antenna assembly are the same as those disclosed in the prior art and have not been improved, so details are not described herein again. To further ensure that built-in antenna assembly 21 is not damaged when the detection part 2 touches the bottom surface during use, one end that is of the second housing 22 and that is far away from the host machine 1 is further sleeved with an anti-collision soft rubber 24.

According to the positioning device for pipeline detection of the present invention, the detection part 2 is in buckling connection with the host machine 1 through the first connecting member 10 and the second connecting member 20, the ejector pin assembly 30 is used for signal feedback, and the host machine 1 and the detection part 2 can be detached and stored when not in use, thereby reducing the occupied space and making it more convenient to carry.

The above mentioned contents are only optional embodiments of the present invention and are not intended to limit the patent scope of the present invention, and under the inventive concept of the present invention, the equivalent structural transformations made by using the contents of the specification and the drawings of the present invention, or direct/indirect applications to other related technical fields, are all included in the patent protection scope of the present invention.

The invention claimed is:

1. A positioning device for pipeline detection, comprising: a host machine and a detection part detachably connected to the host machine, wherein an accommodating cavity is formed in the host machine, a main control board is arranged in the accommodating cavity, a first connecting member is arranged at one end that is of the host machine and that is connected to the detection part, a buckling position is formed on the first connecting member, an accommodating groove is formed at one end that is of the first connecting member and that is far away from the host machine, an ejector pin assembly is arranged in the accommodating groove, an antenna assembly is arranged in an inner cavity of the detection part, the detection part is provided with a second connecting member, the second connecting member is provided with a clamping hook buckled with the buckling position, a part of the second connecting member passes into the accommodating groove and is in buckling connection with the first connecting member, and the detection part is electrically connected to the main control board through the ejector pin assembly.

2. The positioning device for pipeline detection according to claim 1, wherein an annular groove is formed on the first connecting member, the annular groove is arranged at a front end of the accommodating groove, the second connecting member is provided with an outer ring adapted to the annular groove, and the outer ring is sleeved in the annular groove.

3. The positioning device for pipeline detection according to claim 2, wherein the ejector pin assembly comprises an ejector pin, an anti-bending plate provided at a front end of the ejector pin, and an ejector pin ring plate, and the ejector pin is placed in the accommodating groove through a fixed plate.

4. The positioning device for pipeline detection according to claim 3, wherein an inner ring is arranged in the accommodating groove, a first concave step is arranged on the inner ring, and the ejector pin is arranged on the first concave step through a fixed plate.

5. The positioning device for pipeline detection according to claim 2, wherein the detection part comprises a second housing, the second housing comprises an upper housing and a lower housing, the upper housing and the lower housing form the inner cavity, and one end of the second housing is sleeved on an inner side of the outer ring.

6. The positioning device for pipeline detection according to claim 5, wherein an EVA protective jacket is further arranged on a periphery of the antenna assembly.

7. The positioning device for pipeline detection according to claim 5, wherein one end that is of the second housing and that is far away from the host machine is further sleeved with an anti-collision soft rubber.

8. The positioning device for pipeline detection according to claim 1, wherein the host machine comprises a first housing, the host machine is further provided with a handheld part, and the handheld part and the first housing are integrally formed.

9. The positioning device for pipeline detection according to claim 8, wherein the handheld part is provided with an anti-slip rubber.

10. The positioning device for pipeline detection according to claim 8, wherein the host machine is further provided with a display assembly and a key assembly, a speaker is arranged in the host machine, and the display assembly, the key assembly and the speaker are electrically connected to the main control board.

\* \* \* \* \*